United States Patent [19]

Daly

[11] Patent Number: 5,048,902

[45] Date of Patent: Sep. 17, 1991

[54] DECK STORAGE CABINET

[75] Inventor: Lewis J. Daly, Fayetteville, N.Y.

[73] Assignee: Triad Technologies, Inc., Syracuse, N.Y.

[21] Appl. No.: 596,970

[22] Filed: Oct. 15, 1990

[51] Int. Cl.⁵ .......................................... A47B 43/00
[52] U.S. Cl. ................................ 312/250; 312/257.1; 312/321.5; 312/311
[58] Field of Search ..................... 312/257.1, 250, 254, 312/329, 350, 321.5, 311; 211/187

[56] References Cited

U.S. PATENT DOCUMENTS

| | | | |
|---|---|---|---|
| 2,258,489 | 10/1941 | Grindle | 312/257.1 X |
| 3,829,186 | 8/1974 | Jonas | 312/257.1 X |
| 3,853,367 | 12/1974 | Jamison et al. | 312/257.1 X |
| 3,971,608 | 7/1976 | Gans | 312/257.1 |
| 4,474,416 | 10/1984 | Rogahn | 312/250 X |
| 4,693,526 | 9/1987 | Spiegel | 312/250 |
| 4,782,972 | 11/1988 | Wenkman et al. | 312/257.1 X |

Primary Examiner—Joseph Falk
Attorney, Agent, or Firm—Wall and Roehrig

[57] ABSTRACT

An upright cabinet of molded construction suitable for outside use in storing various types of equipment. The component parts of the cabinet interlock in assembly to provide a high strength structure. Front and rear recesses furnish additional strength and rigidity to the structure as well as protectively housing the rear wall and front door of the cabinet.

11 Claims, 3 Drawing Sheets

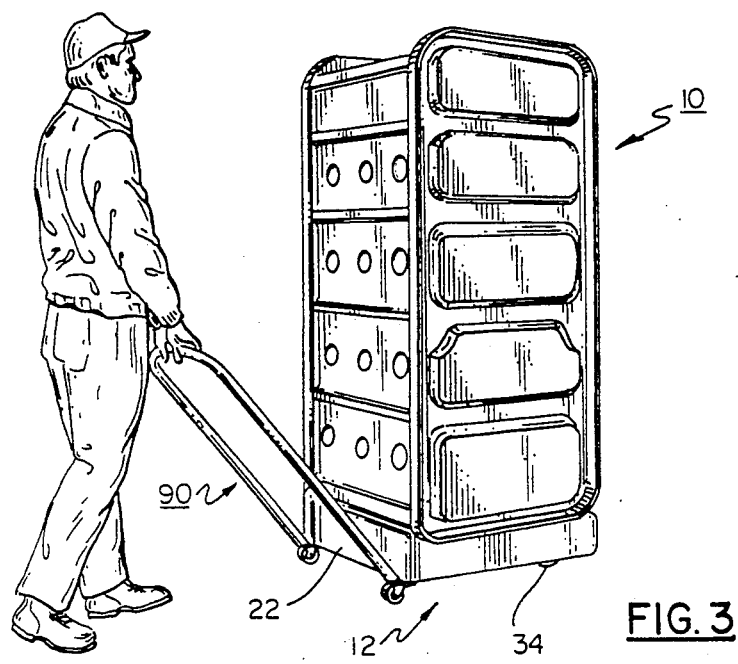
FIG. 3
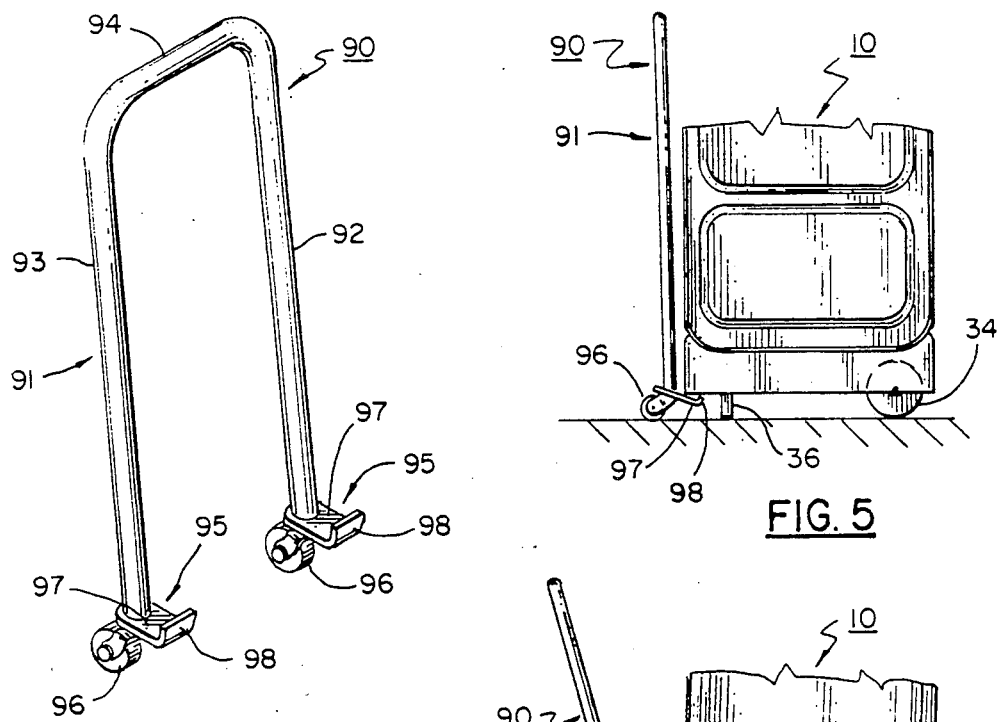
FIG. 4
FIG. 5
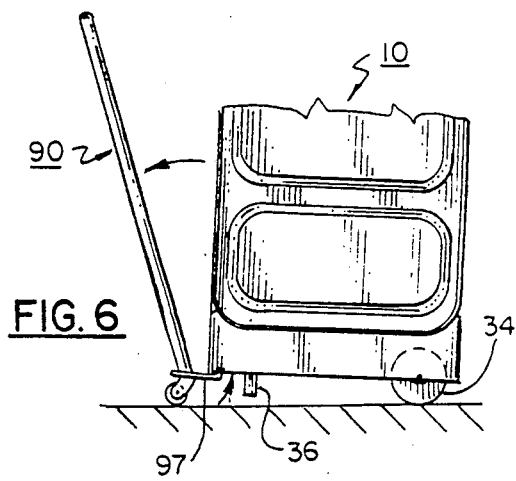
FIG. 6

DECK STORAGE CABINET

BACKGROUND OF THE INVENTION

This invention relates to an all molded storage cabinet for housing various types of equipment and in particular to an outdoor storage cabinet that can be used at pool side to house pool related gear.

Many homes, golf courses, tennis clubs, and the like now have outdoor swimming pools that are used for recreational purposes and for conducting training exercises, such as swimming, scuba diving, life saving, and the like. Accordingly, a good deal of swimming gear and pool maintenance equipment, if not properly stored, soon becomes lost, damaged or stolen. Permanent storage facilities are sometimes erected at pool side for housing this type of equipment. These permanent storage facilities, because they are exposed all year to the outdoor elements, tend to deteriorate with time if not constantly maintained. As the facility deteriorates, it becomes unsightly and detracts from the surroundings and exposes the equipment stored therein to rain or snow whereupon the equipment will rot, rust or corrode. Replacing a permanent facility can also be relatively expensive.

Permanent outdoor storage facilities are oftentimes simple top opening bins into which the equipment to be stored is deposited. As a consequence, the equipment stacks up one piece upon another making retrieval difficult, except for the equipment sought at the top of the stack. By the same token, equipment on the bottom of the stack can be damaged by the shear weight of the stack or by being roughly handled as it is being retrieved from the stack.

OBJECTS AND SUMMARY OF THE INVENTION

It is therefore an object of this invention to improve storage cabinets for both indoor and outdoor use, and in particular, storage cabinets for housing swimming gear and equipment normally used to maintain swimming pools.

A further object of the present invention is to provide an upright molded storage cabinet for storing equipment in a safe and orderly fashion.

A still further object of this invention is to provide a transportable outdoor cabinet for storing various types of equipment that has an all molded construction capable of withstanding all types of weather.

Another object of the invention is to provide an outdoor storage cabinet made of all molded components that are brought together to provide a unit of extremely high strength.

A still further object of the present invention is to provide a transportable outdoor storage cabinet of all molded construction in which pool side equipment or the like can be stored in an orderly fashion and easily accessed without danger of the equipment being damaged.

These and other objects of the present invention are attained by an upright cabinet suitable for outside use that is constructed of all molded parts which are brought together to provide a high strength structure that is imprevious to weather. The side walls of the cabinet are mounted in contoured seats formed in the base with the top wall locking over the side walls to define an enclosure having front and rear openings. An L-shaped flange surrounds the openings which provide added strength to the structure. The flanges coact with front and rear grooves formed in the base to define a front recess that surrounds the front opening and a rear recess framing the rear opening. A rear wall is seated in the rear recess stationarily secured in place to close the back of the cabinet. A door is hinged in the front recess by which access is gained to storage trays and shelves within the cabinet. Outwardly disposed reinforcing ribs are placed in the side walls and the back wall of the cabinet and guideways are molded in the ribs for slidably containing the trays inside the cabinet.

BRIEF DESCRIPTION OF THE DRAWINGS

For a better understanding of these and other objects of the present invention, reference will be made to the following detailed description of the invention which is to be read in association with the following drawings, wherein:

FIG. 3 is a perspective view showing the cabinet and an associated lifting apparatus for moving the cabinet from place to place;

FIG. 4 is an enlarged perspective view of the lifting apparatus shown in FIG. 4; and FIGS. 5 and 6 are partial side elevations showing the operation of the lifting apparatus.

DETAILED DESCRIPTION OF THE INVENTION

Figure 1:
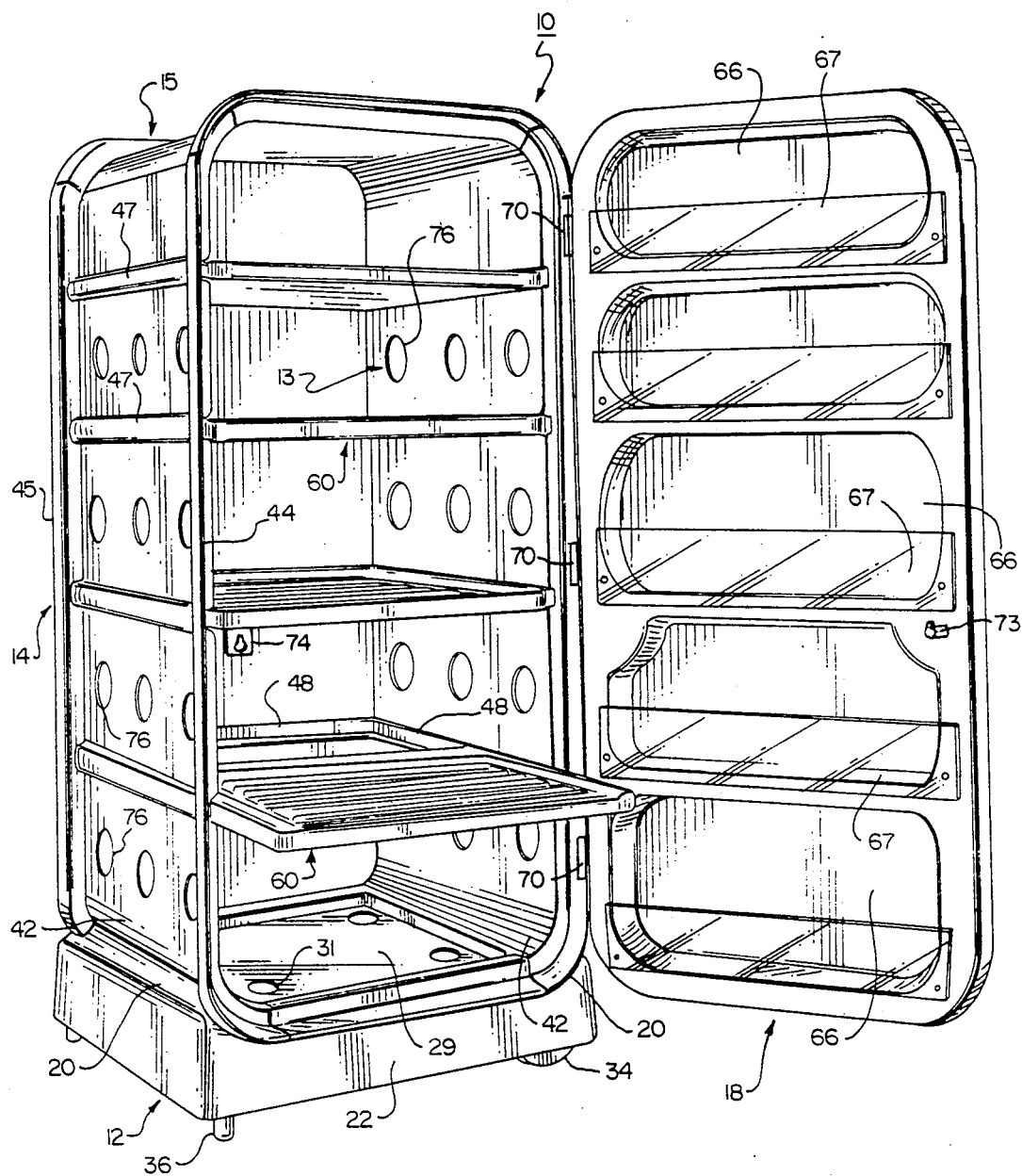
FIG. 1 is a front elevation in perspective showing a cabinet embodying the teachings of the present invention.

Referring now to the drawings, there is shown an upright cabinet of molded construction, generally referenced 10, that is ideally suited for outdoor use to store such things as recreational gear and pool maintenance equipment in a neat and orderly manner. Although the cabinet is primarily designed for outdoor use, it can also be used indoors in such places as cellars, recreation and storage rooms, garages, sheds and the like to safely store a wide assortment of goods. As will be disclosed in further detail below, the cabinet is mobile and thus can be easily moved about between desired locations.

Figure 2:
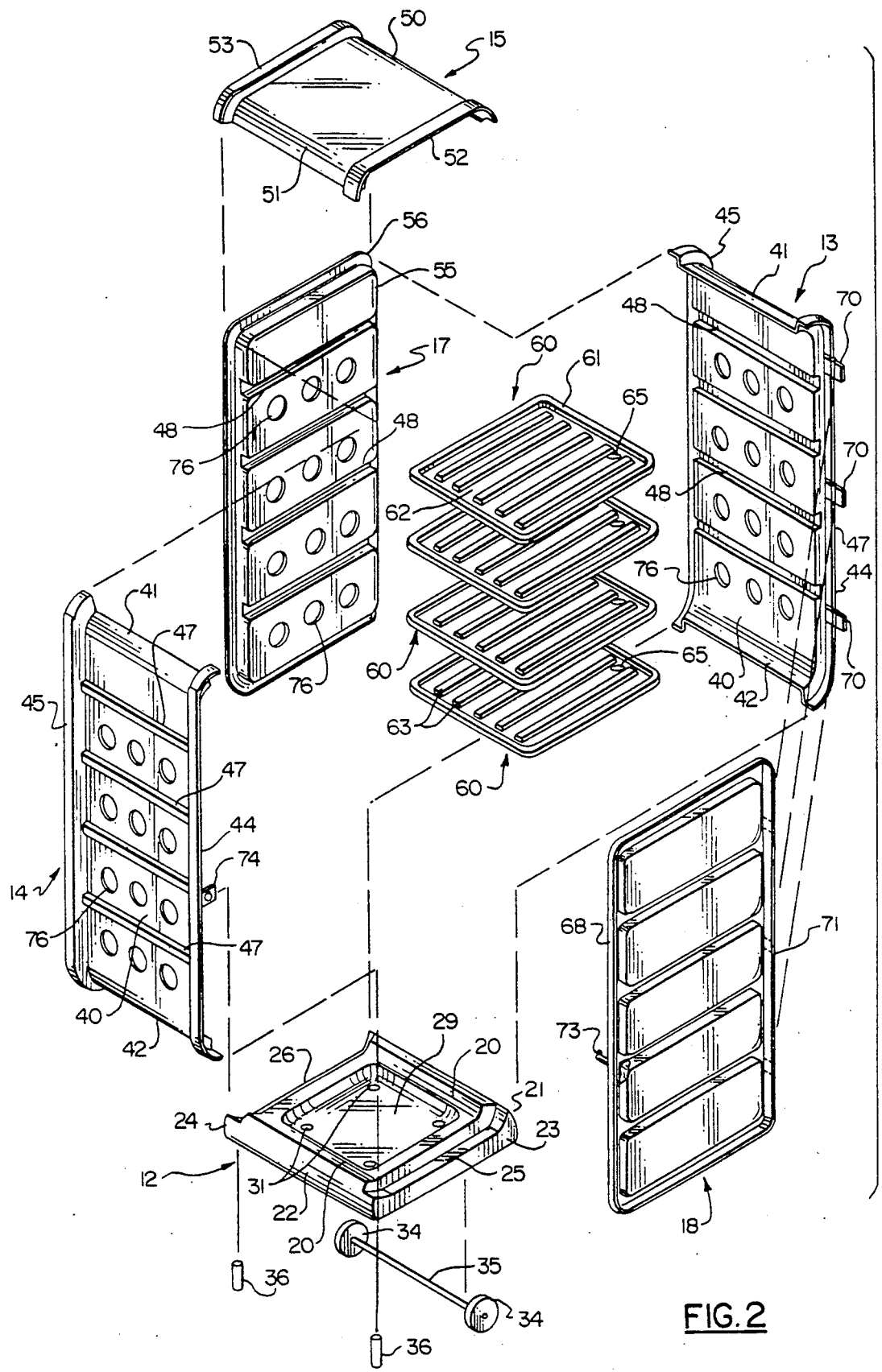
FIG. 2 is an exploded view in perspective showing the component parts of the cabinet shown in FIG. 1.

As best seen in FIG. 2, the cabinet is made up of a number of interrelated parts that are brought together to form a rectangular shaped upright structure. The interrelated parts of the cabinet are molded from a suitable thermoplastic preferably using vacuum forming techniques. The main part of the structure includes a base 12, a pair of side walls 13 and 14, and a top wall 15 that are secured together to form a rigid four sided structure. The back of the structure is closed by a back wall 17. A door 18 is hingedly mounted upon one of the side walls and is arranged to open and close against the front of the structure to provide access to the interior thereof.

The base 12 of the cabinet is a rectangular shaped member that contains a pair of raised arcuate shaped seats 20—20 formed along the opposing side walls 21 and 22 thereof. The curved portion of the seats face inwardly toward the center of the base and transcend an arc of about 90°. The base further includes front and rear walls 23 and 24 that are cojoined to the side walls to establish a skirt that encircles the base to provide additional strength and rigidity to the base member. Front and rear recesses 25 and 26 are formed in the front and rear walls of the base. The recesses are L-shaped elements having cojoined horizontal and vertical walls of about equal width. The end sections of the recesses curve upwardly about 90° and complement the contour of the adjacent seats. A sunken floor 29 is provided in the base which has a series of holes therein that allow any moisture that might collect in the floor region to drain freely from the cabinet.

A pair of wheels 34—34 are rotatably mounted upon a common shaft 35 and the shaft is secured beneath the floor of the base member adjacent to one of the side walls. A pair of spaced apart support legs 36 are also mounted beneath the floor adjacent to the opposite side wall. The wheels and legs cooperate to support the cabinet in an upright position as shown in FIG. 1, when resting on a flat level surface. The cabinet is easily transported from place to place by simply lifting the legged end of the base slightly and wheeling the cabinet to a new location. A two wheel dolly having swivel casters mounted on a lifting frame capable of hooking under the skirt can be used for this purpose.

The two cabinet side walls 13 and 14 are molded to the same configuration. Each wall includes a vertically disposed panel 40 having top and bottom end sections 41 and 42 that are curved to complement the curve of the seats fromed in the base. Dependent L-shaped flanges 44 and 45 are extended along the front and back edges of the side wall panels. As best seen in FIG. 1, the curved bottom section of each side wall is inserted inside a contoured seat and the curved portion of the edge flanges are received snugly in the curved portions of the front and rear recesses of the base member. The flanges open outwardly in regard to the panels and are shaped to form an extension of the base recesses. Horizontal outwardly disposed ribs 47—47 are also formed in each panel. The ribs are spaced vertically along the panels and a recessed guideway 48 runs along the inside of each rib, the purpose of which will be explained in greater detail below. The ribs and flanges not only serve a functional purpose, but also add strength and rigidity to the overall cabinet assembly.

The curved top sections of the side walls are joined together by means of top wall 15. The top wall also includes two curved end sections 50 and 51 that complement the curve sections 41—41 of the side walls. In assembly, the top wall is fitted over the top sections of the two side walls to enclose the structure and provide an opening in front and a back. The top wall contains a front flange 52 and back flanges 53 that conform to those carried by the side walls. When the top wall is seated upon the side walls as shown in FIG. 1, the front and rear flanges fit snugly into the front and rear flanges of the side wall to establish front and rear recesses encircling the front and rear openings.

The back wall 17 of the cabinet is fully contained within the rear recess to close the rear opening. The back wall includes a vertical panel 55 that is encircled by a flange 56 that fits snugly into and interlock with the rear flange of the cabinet. The rear wall has outwardly extended ribs that are similar to and horizontally aligned with the ribs 47—47 carried by the side walls. Guideways 48—48 are formed on the inside of the ribs which coact with the guideways formed in the side wall to slidably receive and support trays 60—60 therein. Each tray 60 consists of an inverted peripheral channel 61 that surrounds a recessed platform 62. A series of reinforcing ribs 63—63 are molded in the platform and at least one hole 65 is passed through the platform to allow moisture to freely drain from the tray.

The front of the cabinet is closed by means of door 18. The door contains a series of horizontally aligned outwardly extended shelf sections 66—66 which, as seen in FIG. 1, furnish additional interior storage spaces. A retaining strip 67 is mounted across the lower part of each shelf which helps to retain goods stored in the shelves as the door is opened and closed. The door is encircled by a peripheral flange 68 which again seats snugly within the front recess of the cabinet when the door is in a closed position. A series of blind piano hinges 70—70 are secured to the inside of the front flange of the side wall 13 (FIG. 2) and to the flange 71 on the door 18. The door also contains a latch mechanism 73 that coacts with a latch plate 74 secured in the side wall 14 to hold the door securely shut when placed in a closed condition.

A series of ventilation holes 76—76 are formed in the side walls and the back wall of the cabinet. The holes are large enough to let air flow freely through the cabinet and thus aid in drying of equipment stored in the cabinet. The ventilation holes are placed beneath the horizontal ribs 47—47 to help prevent moisture flowing down the walls from passing into the cabinet. It should be evident, however, that for certain applications, the ventilation holes can be eliminated to provide a completely weather-tight structure. In assembly, the parts of the cabinet are brought together as explained above with the edge flanges being fitted snugly together to form a tight structure of all molded construction. The parts can be joined in assembly by any suitable means such as by use of sonic welding, epoxy resins, mechanical fasteners or the like.

Turning now to FIGS. 3-6, there is shown a wheeled lifting unit 90 moving the cabinet 10 from place to place. The unit consists of a U-shaped frame 91 having a pair of parallel legs 92 and 93 that are connected by a handle bar 94. A lifting bracket 95 is connected to the lower end of each leg immediately above a swivel caster 96. Although not shown, each caster is equipped with a shaft that passes upwardly through the base plate 97 of the bracket and is rotatably received in the adjacent leg to permit the caster to turn freely through 360°. Each bracket further includes an integral raised flange 98 that is turned upwardly about 90° to the plate.

As best seen in FIG. 5, when the arms of the frame are brought to a vertical position, the plate of the lifting bracket is inclined downwardly, thereby permitting the flanges 98 of the brackets to pass under sidewall 22 of the base 12, this being the side adjacent to the legs 36. Rotating the frame away from the cabinet causes the plates to turn upwardly, placing the flanges inside the sidewall and the bottom of the wall resting securely on the plates. Further rotation of the frame places the plates in a horizontal position, thus lifting the legs free of the floor or surface upon which the cabinet is seated.

When the frame is rotated to a lifting position, as shown in FIG. 6, the weight of the cabinet is resting upon the two rear wheels 34—34 and the two steering casters 96—96. Accordingly, a person can easily move and maneuver the cabinet from place to place.

While this invention has been explained with reference to the structure disclosed herein, it is not confined to the details as set forth and this application is intended to cover any modifications and changes as may come within the scope of the following claims.

What is claimed is:

1. An upright cabinet of all molded construction for storing equipment that includes
    a rectangular shaped base having arcuate shaped inwardly facing seats extending along opposite side edges of said base and L-shaped recesses formed in front and back walls of the base, said recesses curving upwardly at either end to complement the curvature of the inwardly facing seats,
    a pair of opposed vertically disposed side walls mounted on the base, each side wall including a vertical panel that is curved along the top and bottom edge sections with the bottom edge section being seated securely in contact within one of said seats,
    an L-shaped flanges extending along the front and rear edges of said side wall panels with the bottom section of the front and rear flanges being seated within and in contact with the curved end sections of said front and rear recesses formed in said base whereby the recesses are continued upwardly by the flanges along the front and back edges of said side walls,
    a top wall having curved end sections that are seated in overlying contact with the curved top edge section of said side walls, said top wall having L-shaped flanges extending along the front and rear edges, the ends of the top wall flanges being fitted into the edge flanges of the side walls so that the recesses encircle front and rear openings defined by said base and said walls, a back wall mounted in the rear recesses for closing the rear opening, and
    a door hingedly mounted in the front recess that can be opened to gain access to said cabinet.

2. The cabinet of claim 1 wherein the side wall panels and the rear wall contains equally spaced outward disposed horizontally aligned ribs for providing additional strength and rigidity to said walls.

3. The cabinet of claim 2 wherein said ribs contain interior recesses formed therein to establish horizontal guideways in said walls and further including tray means slidably supported in said guideways.

4. The cabinet of claim 1 that further includes a series of shelves molded into the inside of said door and further including retaining bars extending across each shelf for preventing articles stored therein from being dislodged.

5. The cabinet of claim 1 that further includes wheel means mounted in said base for permitting said cabinet to be moved from place to place.

6. The cabinet of claim 2 wherein at least one of said walls contain ventilation holes located beneath said ribs.

7. The cabinet of claim 3 wherein each tray means includes a channel means around its entire periphery and a floor means recessed inside said channel means.

8. The cabinet of claim 1 further including fastening means for securing the molded parts in assembly.

9. The cabinet of claim 1 that further includes a pair of wheels mounted in said base, and leg means also mounted in the base to prevent the cabinet from rolling when the leg means and the wheels are seated upon a support surface.

10. The cabinet of claim 9 that further includes a removable lifting means for lifting said legs from said support surface, a caster means for cooperating with the wheels for moving the cabinet from place to place.

11. The cabinet of claim 10 wherein said lifting means further includes a frame in which said casters are rotatably supported and bracket means for engaging the base adjacent the leg means and lifting said legs from said support surface when the frame is rotated about the casters downwardly toward the support surface.

* * * * *